United States Patent [19]

Kamhi

[11] 4,405,513
[45] Sep. 20, 1983

[54] NOVEL CATIONIC-SUBSTITUTED 9,10-BIS-(PHENYLETHYNYL)ANTHRACENES

[75] Inventor: Victor M. Kamhi, Middlesex, N.J.

[73] Assignee: American Cyanamid Company, Stamford, Conn.

[21] Appl. No.: 388,853

[22] Filed: Jun. 16, 1982

[51] Int. Cl.³ .............................................. C09K 11/06
[52] U.S. Cl. .............................. 252/700; 252/186.43; 585/25; 585/320; 585/321; 585/422
[58] Field of Search ................ 252/188.3 CL; 585/25, 585/320, 321, 422

[56] References Cited

U.S. PATENT DOCUMENTS

| | | | |
|---|---|---|---|
| 3,557,233 | 1/1971 | Zweig et al. | 252/700 |
| 3,729,426 | 4/1973 | Zweig et al. | 252/700 |
| 3,888,786 | 6/1975 | Maulding | 252/700 |
| 4,076,645 | 2/1978 | Vega | 252/700 |

Primary Examiner—Irwin Gluck
Attorney, Agent, or Firm—Gordon L. Hart

[57] ABSTRACT

Compounds useful as fluorescers in aqueous chemiluminescent mixtures, have the formula

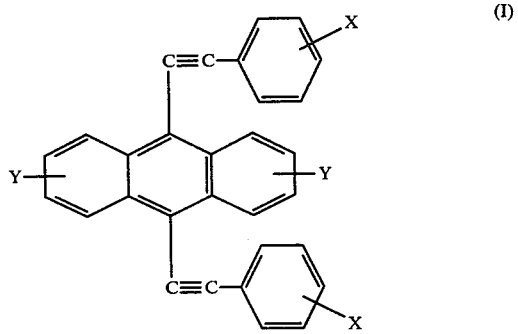

(I)

wherein X and Y represent hydrogen, or a quaternary ammonium group

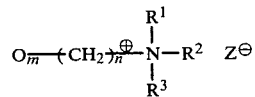

wherein
m is 0 or 1
n is an integer from one to five
$R_1$, $R_2$, $R_3$ represent $C_1$-$C_8$ alkyl, or two of them form ring with N to make piperidinium, morpholinium or pyrrolidinium, and
Z is an ion,
the compound having at least one such quaternary group.

11 Claims, No Drawings

NOVEL CATIONIC-SUBSTITUTED 9,10-BIS-(PHENYLETHYNYL)ANTHRACENES

The invention, described herein, was made in the performance of work supported by the Office of Naval Research (Contract No. N-00014-77-C-0634), and is subject to the provisions of ASPR 7-104.18, December 1969, and ASPR 7-302.23 (b) long form, August 1977.

The invention relates to novel fluorescer compounds, to compositions containing said fluorescers, and processes for producing chemiluminescence, that is, the generation of electromagnetic radiation at wavelengths between 330 and 1000 nanometers by means of a chemical reaction. More particularly it relates to compositions and processes for producing chemiluminescence in aqueous solutions and emulsions.

The generation of chemiluminescence by the reaction of an ester, or amide, of an oxalic acid with a source of hydrogen peroxide in the presence of a fluorescer compound in aqueous systems has been disclosed in U.S. Pat. Nos. 4,053,430 and 4,282,357. However, the emission intensities and efficiencies of these systems are low. There is a need, therefore, for chemiluminescent compositions having higher emission intensities, light capacities, and efficiencies in aqueous systems.

SUMMARY OF THE INVENTION

The invention provides novel fluorescer compounds represented by formula (I)

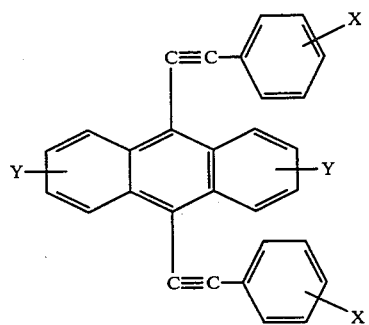

(I)

wherein X and Y represent hydrogen, or a quaternary ammonium group

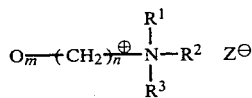

wherein m is zero or 1, n is an integer from 1 to 5, $R^1$, $R^2$, and $R^3$, which may be the same or different, represent $C_1$-$C_8$ alkyl, or $R^1$ and $R^2$ together with the nitrogen atom to which they are attached may form a piperidinium, morpholinium, or pyrrolidinium ring, and $Z^\ominus$ is a anion, with the proviso that the compound contains at least one such quaternary ammonium group.

The present invention also provides a composition for generating chemiluminescence comprising an aqueous solution of (a) a water-soluble reactant, (b) a fluorescer of formula (I), and (c) a surfactant in proportions capable of producing enhanced chemiluminescence on reaction with hydrogen peroxide.

The present invention also provides a composition for generating chemiluminescence comprising an oil-in-water emulsion of (a) a water-soluble reactant, (b) a fluorescer of formula (I), and (c) a surfactant in proportions capable of producing enhanced chemiluminscence on reaction with hydrogen peroxide.

The present invention further provides a composition for generating chemiluminescence comprising a dry mixture of (a) a water-soluble reactant, (b) a solid hydrogen peroxide source selected from the group consisting of sodium perborate, potassium perborate, sodium carbonate peroxyhydrate, and histidine perhydrate, (c) a fluorescer of formula (I), and (d) a surfactant in proportions capable of producing enhanced chemiluminescence when added to water.

The present invention also provides processes for generating chemiluminescence by adding effective amounts of the aforedescribed compositions to an aqueous solution of hydrogen peroxide, or a source of hydrogen peroxide.

The processes of this invention produce quantum yields of about 0.16–0.5%, compared to about 0.02–0.08% for processes without the surfactant.

The aqueous chemiluminescent systems of the present invention provide enhanced emission of light which is useful in a wide variety of applications, particularly for providing emergency light at home, on highways and at sea.

DESCRIPTION

The chemiluminescent reaction mixture contains a water-soluble reactant which generates light by reacting with hydrogen peroxide, or a source of hydrogen peroxide, in the presence of a fluorescer compound of formula (I), and a surface-active agent. Preferably, the reactant is a water-soluble ester, or amide, of oxalic acid.

Suitable water-soluble esters of oxalic acid which may be used in the present invention are disclosed by Mohan in U.S. Pat. No. 4,053,430.

Illustrative examples of suitable water-soluble esters of oxalic acid include the dihydrochlorides, dihydrobromides, dihydrofluorides, ditrifluoromethanesulfonates, dimethanesulfonates, di-p-toluenesulfonates, dimethosulfates and diquaternary ammonium salts of the following compounds:

bis[2,6-dichloro-4-[(2-dimethylaminoethyl)methylsulfamoyl]phenyl]oxalate,
bis[2,4-dichloro-6-[(2-dimethylaminoethyl)methylsulfamoyl]phenyl]oxalate,
bis[2-chloro-4-[(2-dimethylaminoethyl)-methylsulfamoyl]phenyl]oxalate,
bis[2-bromo-4-[(2-dimethylaminoethyl)-methylsulfamoyl]phenyl]oxalate,
bis[2,6-dibromo-4-[(2-dimethylaminoethyl)methylsulfamoyl]phenyl]oxalate,
bis[3-fluoro-4-[(2-dimethylaminoethyl)-methylsulfamoyl]phenyl]oxalate,
bis[2,4-dibromo-6-[(2-dimethylaminoethyl)methylsulfamoyl]phenyl]oxalate,
bis[2-fluoro-4-[(2-dimethylaminoethyl)-methylsulfamoyl]phenyl]oxalate,
and the like.

The preferred water-soluble ester of oxalic acid is the dihydrochloride of bis[2,4-dichloro-6-[(2-dimethylaminoethyl)methylsulfamoyl]phenyl]oxalate.

Suitable water-soluble amides of oxalic acid which may be used in the processes and compositions of this invention are disclosed by Tseng and Rauhut in U.S. Pat. No. 4,282,357.

Illustrative examples of suitable water-soluble amides of oxalic acid include the dihydrochlorides, dihydrobromides, dihydrofluorides, di(trifluoromethane) sulfonates, dimethanesulfonates, dimethosulfates, and ditetrafluoroborates of the following compounds:

N,N'-bis(2-morpholinoethyl)-N,N'-bis(trifluoromethylsulfonyl)oxamide,
N,N'-bis(3-morpholinopropyl)-N,N'-bis-(trifluoromethylsulfonyl)oxamide,
N,N'-bis[2-(2-pyridyl)ethyl]-N,N'-bis(trifluoromethylsulfonyl)oxamide,
N,N'-bis[3-(2-pyridyl)propyl]-N,N'-bis(trifluoromethylsulfonyl)oxamide,
N,N'-bis(6-morpholinohexyl)-N,N'-bis(trifluoromethylsulfonyl)oxamide,
N,N'-bis[2-(4-pyridyl)ethyl]-N,N'-bis(trifluoromethylsulfonyl)oxamide,
N,N'-bis[5-(3-pyridyl)pentyl]-N,N'-bis(trifluoromethylsulfonyl)oxamide, and the like.

The preferred water-soluble oxamide is 4,4'-[oxalylbis[[(trifluoromethyl)sulfonyl]imino]ethylene]bis(4-methylmorpholinium trifluoromethanesulfonate).

The compounds of formula (I) can be prepared by reacting about two molecular proportions of the lithium salt of an X-substituted phenylacetylene with one molecular proportion of an anthraquinone to obtain the corresponding 9,10-dihydro-9,10-dihydroxy-9,10-bis(phenylethynyl)anthracene, which is then converted to the 9,10-bis(phenylethynyl)anthracene by methods described by Maulding in U.S. Pat. No. 3,911,038. The 9,10-bis(phenylethynyl)anthracene is then quaternized by conventional methods to produce the desired compound of formula (I). Illustrative examples of compounds of formula (I) include 4,4'-[9,10-anthracenediylbis(1,2-ethynediyl-1,4-phenylenemethylene)]bis(4-methylmorpholinium methyl sulfate),
3,3'-[9,10-anthracenediylbis(1,2-ethynediyl-1,4-phenylenemethylene)]bis(4-n-butylmorpholinium n-butyl sulfate),
4,4'-[9,10-anthracenediylbis(1,2-ethynediyl-1,4-phenylenemethylene)]bis(1-,n-pentylpyrrolidinium) bromide,
2,2'-[9,10-anthracenediylbis(ethynediyl-4,1-phenyleneoxy)]bis(N,N,N-trimethylethanaminium chloride),
1,1'-[[9,10-bis(phenylethynyl)-2,6-anthracenediyl]-bis(2,1-ethanediyl)]bis(1-methylpiperidinium methyl sulfate),
4,4'-[9,10-anthracenediylbis(1,2-ethynediyl-1,4-phenylenemethylene)]bis(4-methylmorpholinium trifluoromethanesulfonate),
2,2'-[[9,10-bis(phenylethynyl)-2,6-anthracenediyl]bis-(oxy)]bis(N,N,N-trimethylethanaminium methyl sulfate), and the like.

The preferred compound of formula (I) is a mixture of 3,3' and 4,4'-[9,10-anthracenediylbis(1,2-ethynediyl-1,4-phenylenemethylene)]bis(4-methylmorpholinium methyl sulfates).

The chemiluminescent reaction mixture contains about about 0.1–5% by weight of an anionic, cationic, or non-ionic surface-active agent, herein also referred to as "surfactant," which is not rapidly oxidized by hydrogen peroxide. The terms "surface-active agent," or "surfactant," as used herein, are defined as substances that lower the surface tension of a liquid, or the interfacial tension between two liquids.

Illustrative examples of suitable surfactants include the following:
nonylphenoxy tetraethoxyethanol,
nonylphenoxy hexaethoxyethanol,
nonylphenoxy heptaethoxyethanol,
nonylphenoxy nonaethoxyethanol,
nonylphenoxy decaethoxyethanol,
octylphenoxy nonaethoxyethanol,
isooctylphenoxy decaethoxyethanol,
trimethylnonyl polyethyleneglycol ether,
sodium dodecylsulfate,
sodium diamylsulfosuccinate,
sodium dihexylsulfosuccinate,
sodium bis(2-ethylhexyl)sulfosuccinate,
sodium bis(tridecyl)sulfosuccinate,
disodium N-octadecylsulfosuccinamate,
sodium 2-ethylhexylsulfate,
sodium heptadecylsulfate,
n-dodecyltrimethylammonium chloride,
and the like.

Preferably, the reaction mixture contains about 0.75–3.5% by weight of a nonionic surfactant which is a nonylphenoxy polyethoxyethanol containing about 4 to 15 oxyethylene groups per molecule.

The initial molar concentrations (moles per liter of solution) of the oxalic acid ester, or amide, may vary considerably. It is only necessary that it be present in sufficient concentration to obtain chemiluminescence.

The initial molar concentration is in the range of $10^{-3}$ to 5, preferably about $10^{-2}$ to 1.0.

The molar concentration of the fluorescer compound used is about $10^{-5}$ to 1, preferably about $10^{-3}$ to $10^{-1}$.

The initial molar concentration of the hydrogen peroxide compound used is from about $10^{-3}$ to 10.0, preferably about $10^1$ to 4.0. The mole ratio of hydrogen peroxide to oxalic acid ester, or amide, used ranges from about 0.5 to 100, preferably about 20 to 60.

The ingredients of the chemiluminescent compositions of this invention are kept separated until chemiluminescence is desired, when they may be admixed in a single step or in a series of steps. The order of admixing of the ingredients is usually not critical. The hydrogen peroxide compound, surfactant, and fluorescer compound may be dissolved in water and the oxalic acid ester, or amide, added thereto as a solid, or in a suitable inert diluent, to initiate chemiluminscence. Alternatively, the oxalic acid ester, or amide, surfactant, and fluorescer compound may be dissolved in water, and the hydrogen peroxide compound added thereto to initiate chemiluminescence. Optionally, a solution of the hydrogen peroxide compound in water may be added to a solid mixture of oxalic acid ester, or amide, surfactant, and fluorescer compound to initiate chemiluminescence.

An illustrative example of a suitable mixture contains the following: 13.23% by weight of 4,4'-[oxalylbis[(trifluoromethylsulfonyl)imino]ethylene]bis-(4-methylmorpholinium trifluoromethanesulfonate), 2.12% by weight of a mixture of 3,3' and 4,4'-[9,10-anthracenediylbis (1,2-ethynediyl-1,4-phenylenemethylene)]bis(4-methylmorpholinium methyl sulfates), 2.65% by weight of Tergitol ® Nonionic Surfactant NP-13, and 82.00% by weight of sodium perborate.

The hydrogen peroxide source employed in the compositions and processes of this invention may be an aqueous solution of hydrogen peroxide per se, or a hydrogen peroxide-producing compound, such as sodium perborate, potassium perborate, sodium carbonate peroxyhydrate, histidine perhydrate, and the like.

Variation of the pH of the reaction medium from about 3.0 to about 8.4 shows that the quantum yield is dependent on the pH. The maximum quantum yield is obtained at a pH of 3.

Superior intensity of chemiluminescence is obtained when the final mixture producing the luminescence is maintained at a temperature from about $-10°$ to $50°$ C., preferably from about $15°$ to $40°$ C.

The invention is described in more detail by the following examples in which concentrations in moles per liter are indicated by the letter "M." All parts, and percentages, are by weight unless otherwise indicated. In all of the examples which follow, the aqueous solution of hydrogen peroxide employed contains 1.75 moles per liter of hydrogen peroxide, and 0.0012 mole per liter of sodium salicylate, which catalyzes the reaction.

EXAMPLE 1

Preparation of a mixture of 8, 10-Bis[3(and 4)-[4-(morpholinyl)methyl]phenylethynyl]anthracene A suspension of lithium amide (1.1 grams; 0.048 mole) and a mixture of 3 (and 4)-[4-(morpholinyl)methyl]-phenylacetylene (8.8 grams; 0.044 mole) in dioxane (100 mls) is heated at a reflux under a nitrogen atmosphere for 3 hours, and then cooled to $15°$ C. Anthraquinone (4.1 grams; 0.02 mole) and additional dioxane (25 mls) are added thereto, and the suspension is heated at reflux for 18 hours and then cooled to room temperature. Aqueous acetic acid (10 mls; 50% by weight acetic acid) is added thereto followed by a solution of stannous chloride dihydrate (3.5 grams) in dimethylformamide (25 mls). The reaction mixture is then stirred at room temperature for 24 hours, and the solvent is removed under vacuum. The residue is treated with sulfuric acid (20 mls; 5 N) followed by ethanol (80 mls) to produce a yellow solid which is recovered by filtration and washed with ethanol ($2\times25$ mls). The solid is dissolved in hot water and treated with sodium hydroxide (5 N) to precipitate a gummy solid which is recovered by filtration and dissolved in hot toluene. Evaporation of the toluene yields a red semi-solid which is extracted with hot methylcyclohexane. The extract is treated with Darco ® decolorizing carbon and filtered. The orange solid which precipitates from the filtrate is recovered and dried under vacuum to obtain the desired product, m.p.$150°-168°$ C.

Calculated for $C_{40} H_{36} N_2 O_2$: C,83.33%; H,6.25%; N,4.86%. Found: C,83.97%; H,6.15%; N,4.38%.

EXAMPLE 2

Preparation of a mixture of 3,3' and 4,4'-[9,10-Anthracenediylbis(1,2-ethynediyl-1,4-phenylenemethylene)]-bis(4-methylmorpholinium methyl sulfates)

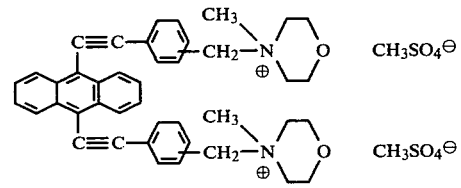

A solution of dimethyl sulfate (1.0 ml; 0.01 mole) in 1,2-dichloroethane (10 mls) is added dropwise to an ice-cooled solution of the product of Example 1 (2.9 grams; 0.005 mole) in 1,2-dichloroethane (50 mls) over a period of 20 minutes. The resulting solution is stirred at $0°-5°$ C. for 30 minutes, allowed to warm to ambient temperature and stirred thereat for 1 hour then heated to reflux for 18 hours. The yellow-colored precipitate which forms is recovered by filtration, washed successively with 1,2-dichloroethane ($2\times50$ mls) and hexane ($2\times50$ mls), then dried under vacuum; m.p. $254°-260°$ C.

Calculated for $C_{44} H_{48} N_2 O_{10} S_2$: C,63.77%; H,5.80%, N,3.34%; S,7.73%. Found: C, 61.82%; H,6.00%; N, 3.36%; S,7.47%.

EXAMPLE 3

Preparation of a mixture of 3,3' and 4,4'[9,10-anthracenediylbis(1,2-ethynediyl-1,4-phenylenemethylene)]bis(4-methylmorpholinium trifluonomethanesulfonates)

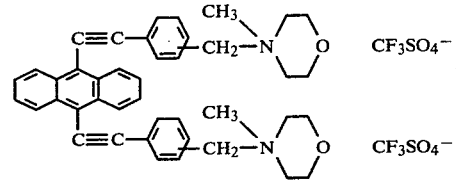

A solution of methyl trifluoromethanesulfonate (1.74 grams; 0.01 mole) in dichloromethane (10 mls) is added dropwise to an ice-cooled solution of the product of Example 1 (2.9 grams; 0.005 mole) in dichloromethane (50 mls) over a period of 30 minutes. The solution is then allowed to warm to ambient temperature, and stirred thereat for 18 hours. The resulting precipitate is isolated by filtration, rinsed with dichloromethane, and dried under vacuum; m.p.$>320°$ C.

EXAMPLE 4

Preparation of 2,2'-[[9,10-Bis(phenylethynyl)-2,6-anthracenediyl]bis(oxy)]bis(N,N,N-trimethylenethanaminium methyl sulfate)

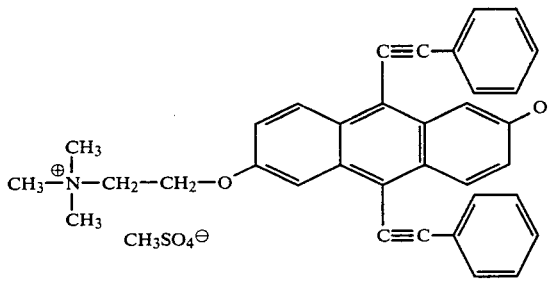

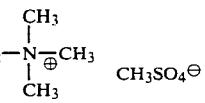

To a solution of 2, 6-bis[2'-(dimethylamino)-ethoxy] anthraquinone dihydrochloride dihydrate (4.08 grams) in distilled water (75 mls) is added 5 N sodium hydroxide (3 mls). The yellow solid which separates is filtered, washed with water, and dried in vacuo. A second crop is obtained by partial evaporation of the filtrate and addition of more 5 N sodium hydroxide. The total weight of both crops is 3.32 grams. Both crops have a nuclear magnetic resonance spectrum consistent with the expected diamine structure.

The above-described diamine, (2.60 grams; 0.0068 mole) is added to dioxane (50 mls) along with phenylacetylene (3.0 mls; 0.0272 mole) and lithium amide (0.63 gram; 0.0272 mole) under an argon atmosphere. The reaction mixture is then stirred and heated at reflux for 40 hours, cooled to 25° C. and added carefully to distilled water (300 mls). The resulting mixture is extracted with a mixture of equal volumes of chloroform and diethyl ether, and then with chloroform alone. The extracts are combined and the solvent is evaporated under vacuum to obtain a dark brown oil. This oil is dissolved in dimethylformamide (10 mls) and to the solution is added a solution of stannous chloride dihydrate (4.6 grams; 0.0204 mole) in dimethylformamide (10 mls). The mixture is stirred for 2 hours and allowed to stand at ambient temperature for 4 days. The reaction mxiture is then added to water to obtain a finely dispersed precipitate which is recovered by filtration.

The addition of 5% potassium carbonate solution to the filtrate gives a more easily filtered solid. After washing with water and drying, the crude product is recrystallized from toluene to obtain 1.2 grams of an orange solid which is further purified by preparative high-performance liquid chromatography on silica using 1:1 acetone-methanol as the eluant. The middle cuts, which contain the product, are chromatographed again using methanol as the eluant. Analysis of the cuts by thin layer chromatography and combining gives, after evaporation, 0.91 gram of a bright orange solid. The solid is dissolved in dichloromethane (20 mls) and dimethyl sulfate (0.31 ml) is added thereto at ambient temperature. Within a few minutes an orange solid precipitates. Additional dichloromethane (10 mls) is added and the mixture is cooled for several days in a refrigerator. The solid is then isolated by filtration, washed with dichloromethane, and dried to obtain 1.32 grams of the desired product, m.p.>300° C.

Calculated for $C_{42}H_{48}N_2S_2O_{10}$-C,62.66%; H,6.01%; N,3.48%; S,7.96%. Found: C,62.93%; H,6.15%; N,3.67%; S,7.39%.

EXAMPLES 5 AND 6

Aqueous hydrogen peroxide (2.8 mls; 1.75 M), containing sodium salicylate ($1.2 \times 10^{-3}$ M) is added to a cuvette containing 4,4'-[oxalylbis[(trifluoromethylsulfonyl)-imino] ethylene]bis[4-methylmorpholinium trifluoromethanesulfonate] (0.10 gram), and the product of Example 2, to provide molar concentrations of 0.04 and 0.01, respectively. The reaction mixture is mixed thoroughly and the emission intensity is measured at the emission peak of the flurescer versus time by means of a spectroradiometer-luminometer similar to that described by Roberts and Hirt [Appl. Spectrosc., 21,250(1967)] modified with a Jarrell-Ash Model 82-410 grating monochromator and an RCA C31034 photomultiplier with a gallium arsenide photocathode operated at 1300 V with dry ice cooling. Raw data are recorded digitally on a Hewlett-Packard 5150A thermal printer. Spectral response is corrected by calibration against a standard tungsten lamp. Absolute light intensities are obtained by deriving calibration constants based on the accepted fluorescence quantum yield (0.55) for quinine sulfate, as reported by Melhuish [N.Z. Sci. Tech., B, 37, 142 (1955)], in 0.1 N $H_2SO_4$, and by ferrioxalate actinometry [Hatchard et al., Proc. R. Soc. London, Ser. A, 235, 518 (1956) of the exciting light.

The light capacity (the light output in lumen hours per liter of emitting solution) is related to the chemiluminescence brightness and lifetime as described in U.S. Pat. No. 3,816,326.

Chemiluminescence percent quantum yields (einsteins per mole of reactant $\times$ 100) are calculated by monitoring the intensity decay at the emission maximum and calculating the intensity at each time interval in einsteins per second from the chemiluminescence spectrum. Chemiluminescence spectra are then corrected for intensity decay. The total area under the decay curve is calculated by using a combination of a Simpson's rule integration and an exponential extrapolation to infinite time as described by Roberts and Hirt. Data are processed by a Digital Equipment Corp. PDP-11/40 computer.

The time (in minutes) required for 75% of the total light to be emitted is referred to hereafter as $T_{75}$.

A comparison determination is also carried out, as described above, except that the aqueous hydrogen peroxide also contains a nonionic surfactant, DECERESOL ® Surfactant NI Conc. (American Cyanamide Company); the amount of surfactant added is 0.3 gram per 10 mls of aqueous hydrogen peroxide.

The results obtained are shown in Table I under Examples 5 and 6, respectively. There results show that the presence of the surfactant significantly increases the light capacity, quantum yield, and time required for 75% of the total light to be emitted.

EXAMPLES 7 AND 8

The procedures of Examples 5 and 6 are followed in every detail except that the product of Example 3 is substituted for the product of Example 2.

The results obtained are shown in Table II under Examples 7 and 8, respectively.

EXAMPLES 9 AND 10

The procedures of Examples 5 and 6 are followed in every detail except that the product of Example 4 is substituted for the product of Example 2 in an amount to provide a molar concentration of 0.003.

The results obtained are shown in Table III under Examples 9 and 10, respectively.

TABLE I

| Example | Fluorescer | λMax(nm) | Light Capacity | Percent Quantum Yield | $T_{75}$ |
|---|---|---|---|---|---|
| 5 | Compound of Example 2 | 610 | 0.15 | 0.02 | 0.7 |
| 6 | Compound of Example 2 with surfactant | 550 | 1.6 | 0.16 | 7.7 |

(a) Time (in minutes) for 75% of the total light to be emitted.

TABLE II

| Example | Fluorescer | λmax(nm) | Light Capacity | Percent Quantum Yield | $T_{75}$ |
|---|---|---|---|---|---|
| 7 | Compound of Example 3 | 615 | 0.53 | 0.08 | 0.4 |
| 8 | Compound of Example 3 with surfactant | 560 | 4.8 | 0.46 | 7.2 |

TABLE III

| Example | Fluorescer | λmax(nm) | Light Capacity | Percent Quantum Yield | $T_{75}$ |
|---|---|---|---|---|---|
| 9 | Compound of Example 4 | The chemiluminescence lifetime is too short to run the spectrum. | | | |
| 10 | Compound of Example 4 with surfactant | 530 | 5.3 | 0.44 | 4.8 |

We claim:

1. A compound defined by the formula

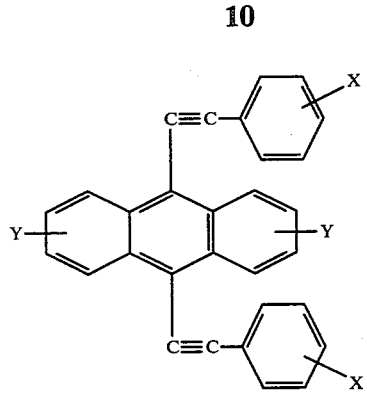

(I)

wherein at least one of the X and Y substituents is a radical defined by the formula:

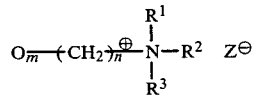

wherein
m is zero or one,
n is an integer from 1 to 5,
$R^1$ is $C_1$ to $C_8$ alkyl,
$R^2$ and $R^3$ are each $C_1$ to $C_8$ alkyl or together with the N-atom form a piperidinium, morpholinium or pyrrolidinium ring,
$Z^\ominus$ is an anion, and
wherein any remaining X and Y substituents are hydrogen.

2. A compound defined by claim 1 wherein each Y is hydrogen and each X is defined by the formula

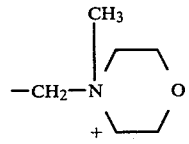

3. A compound defined in claim 2 wherein each $Z^\ominus$ is $CH_3SO_4^\ominus$.

4. A compound defined by claim 2 wherein each $Z^\ominus$ is $CF_3SO_4^\ominus$.

5. A compound defined by claim 1 wherein each X is hydrogen and each Y is

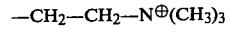

6. A compound defined by claim 5 wherein each $Z^\ominus$ is $CH_3SO_4^\ominus$.

7. A chemiluminescent composition comprising at least one chemiluminescent reactant and at least one fluorescer compound defined by claim 1.

8. A chemiluminescent composition defined by claim 7 wherein the defined chemiluminescent reactant and fluorescer compound are dispersed in aqueous medium.

9. A chemiluminescent composition defined by claim 8 further comprising a nonionic surfactant dispersed in the aqueous medium.

10. A mixture of dry ingredients comprising at least one water-soluble chemiluminescent reactant, a fluorescer compound defined by claim 1, a nonionic surfactant and a water-activatable hydrogen peroxide precursor.

11. A method of producing chemical light which comprises dispersing the composition defined by claim 10 in water.

* * * * *